United States Patent
Juan

(12) 
(10) Patent No.: US 6,523,649 B1
(45) Date of Patent: Feb. 25, 2003

(54) SYNCHRONOUS BRAKING SYSTEM

(76) Inventor: Chih-Chen Juan, No. 278, Lan Tan, Tung-Yang Hsin-Chun, Chiayi City (TW)

( * ) Notice: Subject to any disclaimer, the term of this patent is extended or adjusted under 35 U.S.C. 154(b) by 0 days.

(21) Appl. No.: 10/054,768

(22) Filed: Jan. 22, 2002

(51) Int. Cl.$^7$ .................................................. B62L 3/02
(52) U.S. Cl. .................................. 188/24.16; 188/2 D
(58) Field of Search ............................. 188/2 D, 24.14, 188/24.15, 24.16

(56) References Cited

U.S. PATENT DOCUMENTS

| | | | | |
|---|---|---|---|---|
| 4,480,720 A | * | 11/1984 | Shimano | 188/24.15 |
| 5,431,255 A | * | 7/1995 | Tsuchie | 188/24.16 |
| 5,540,304 A | * | 7/1996 | Hawkins et al. | 188/24.15 |
| 5,927,442 A | * | 7/1999 | Liao | 188/24.16 |
| 6,186,282 B1 | * | 2/2001 | Juan | 188/24.16 |
| 6,311,805 B1 | * | 11/2001 | Juan | 188/24.16 |

* cited by examiner

Primary Examiner—Christopher P. Schwartz
(74) Attorney, Agent, or Firm—Pro-Techtor International Services

(57) ABSTRACT

A synchronous braking system, comprising a seat, a gliding unit, two primary cables, a secondary cable, a driving element, and a blocking device. The gliding unit is mounted on the seat and, gliding thereon in a linear movement. The two primary cables have a far ends that drive the linear movement of the gliding unit. The secondary cable has two ends that are connected with two brakes. The driving element is mounted on the gliding unit, having a roll, with the secondary cable running over the roll and, when pulled aside by the driving element, driving the two brakes, while compensating nonuniform braking forces by a longitudinal movement. The blocking device is tightly fastened to the secondary cable, restricting the longitudinal movement of the secondary cable to a maximum displacement, so that, if one of the two ends of the secondary cable breaks, with an unbroken end remaining, the unbroken end will still exert a braking force.

2 Claims, 4 Drawing Sheets

SYNCHRONOUS BRAKING SYSTEM

BACKGROUND OF THE INVENTION

1. Field of the Invention

The present invention relates to a synchronous braking system, particularly to a synchronous braking system for use in two-wheeled vehicles, such as bicycles and motorcycles.

2. Description of Related Art

Conventional braking systems for two-wheeled vehicles mostly have two independent brakes for the front and rear wheels, which are driven by two independent cables and operated by a left handle and a right handle on a handlebar. This arrangement enables a user to stop the vehicle. However, the two brakes, being operated by separate handles, do not become effective at exactly the same time. Therefore, in the moment when braking is initiated, only one of the wheels undergoes braking, while the other is still rolling freely. Thus the braking effect is reduced, and at this time, the vehicle possibly skids or even falls over.

Since the above effect constitutes a great safety problem, synchronous braking systems have been developed, wherein by operating a single handle, brakes at the front and rear wheels are applied simultaneously.

However, conventional synchronous braking systems in practice do not precisely apply synchronous braking forces, have complicated structures, are difficult to adjust, and thus do not work effectively. The present inventor, in U.S. Pat. No. 6,311,805B (application Ser. No. 09/505,408) has disclosed a synchronous braking system, which comprises: a connecting unit, performing a linear movement, as driven by handles via primary cables; a secondary cable with two ends that are connected with front and rear brakes; and a driving device with a roll, mounted on the connecting unit, pulling on the secondary cable for driving the front and rear brakes. The main characteristic lies in that, when pulled on, the secondary cable is able to move over the roll, transferring forces between the front and rear brakes during braking, so that automatically uniform braking forces are applied, achieving a synchronous braking effect.

Since, however, the secondary cable is a single cable, breaking of one end thereof disables the other end as well, so that both the front and rear brakes do not work.

SUMMARY OF THE INVENTION

It is an object of the present invention to provide a synchronous braking system, which applies braking forces uniformly and synchronously to the front and rear wheels of a bicycle for a better braking effect and increased safety.

Another object of the present invention is to provide a synchronous braking system with a cable which, when broken, does not cause complete failure, achieving improved safety.

The present invention can be more fully understood by reference to the following description and accompanying drawings.

DETAILED DESCRIPTION OF THE PREFERRED EMBODIMENTS

Figure 1:
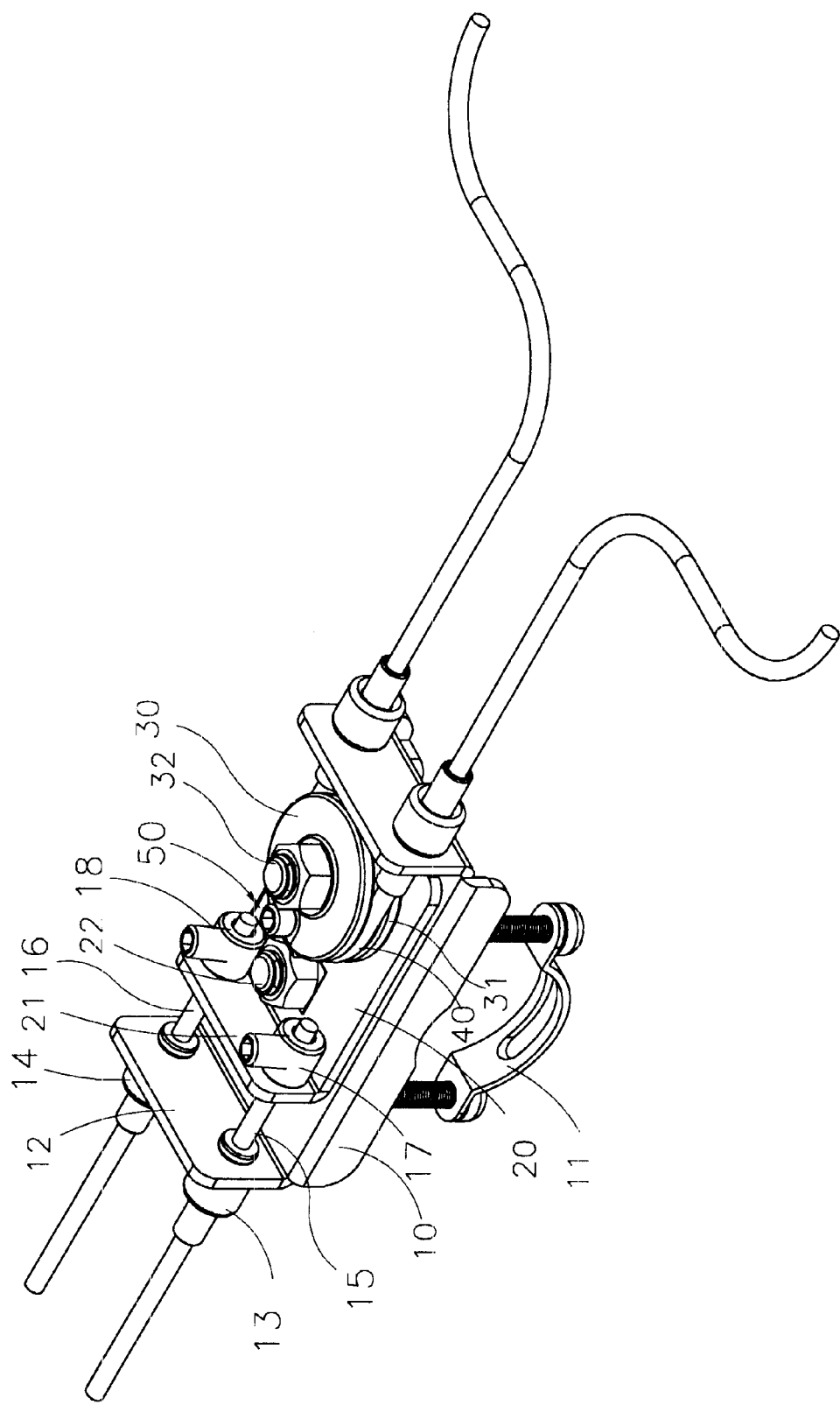
FIG. 1 is a perspective view of the synchronous braking system of the present invention in the first embodiment.

As shown in FIG. 1, the synchronous braking system of the present invention in a first embodiment mainly comprises: a seat 10, mounted on a frame of a bicycle and having two ends; a gliding unit 20, glidingly mounted on the fixed seat; a driving element 30, mounted on the gliding unit 20; and a secondary cable 40, having two ends which lead to front and rear brakes of the bicycle (not shown), driving the front and rear brakes,: as driven by the driving element 30.

A clamp 11 is attached to the seat 10 at a lower side thereof, allowing to fasten the seat 10, to the frame of the bicycle. On a top side of the seat 10, a fixing plate 12 is bent upwards at a right angle. Two guiding tubes 13, 14 pass through the fixing plate 12, allowing two primary cables 15, 16 to be led through. The gliding unit 20 has an upper side that is bent upwards, forming a holding plate 21. The primary cables 15, 16 at ends thereof are held by fixing elements 17, 18 against the holding plate 21. Thus, when one of the primary cables 15, 16 is pulled on by operating a handle, the gliding unit 20 moves linearly on the seat.

The driving element 30 has a roll, into which a peripheral groove 31 is cut. The secondary cable 40 runs over the roll, in the peripheral groove 31. Furthermore, the driving element 30 has a central axle 32 which is set on the gliding unit 20, allowing the driving element 30 to rotate. When the gliding unit 20 undergoes a pulling force by the primary cables 15, 16, the secondary cable 40 is pulled aside by the driving element 30, driving the front and rear brakes to perform a braking movement.

Figure 2:
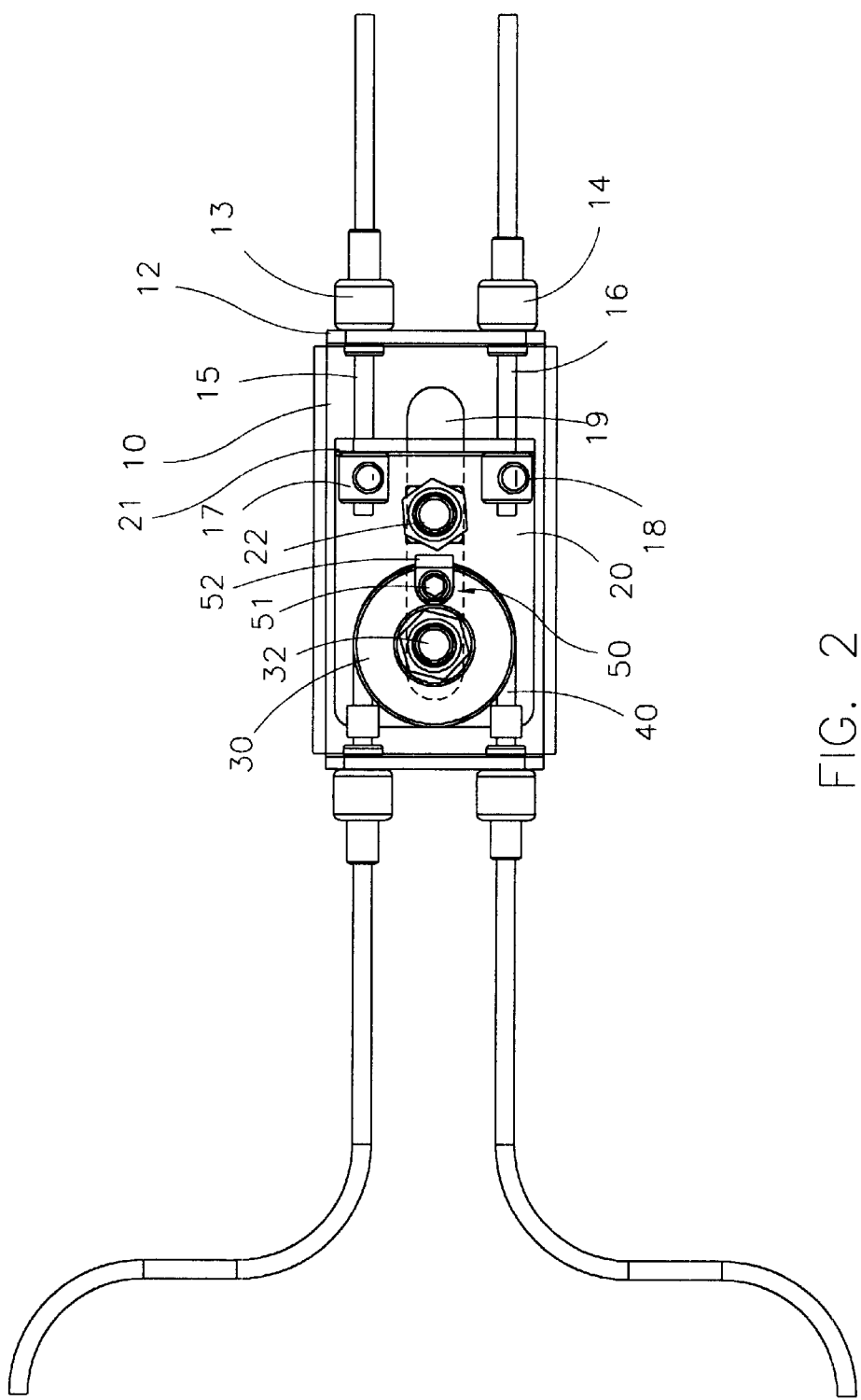
FIG. 2 is a top view of the synchronous braking system of the present invention in the first embodiment.

Referring to FIG. 2, a linear opening 19 is cut into the seat 10. The axle 32 passes through the linear opening 19. A bolt 22 passes through the linear opening 19, as well. Both the axle 32 and the bolt 22 glide along the linear opening 19, restricting the linear movement of the gliding unit 20 on the seat 10.

While driving the front and rear brakes to perform a braking movement, the secondary cable 40, running over the driving element 30 compensates any difference of braking forces at front and rear brakes, automatically achieving uniform distribution of forces. Thus synchronous braking of the front and rear brakes is achieved.

For braking, only one of the handles needs to be operated. The driving element 30 and the secondary cable then simultaneously drive the front and rear brakes to perform synchronous braking with uniform forces. Thus it is avoided that braking forces are insufficient and no skidding due to nonuniform braking will occur.

The main characteristic of the present invention is a blocking device 50, set on the driving element 30. The blocking device 50 comprises a pin 51 which at a lower end passes through the linear opening 19 and has a diameter that is smaller than the width of the linear opening 19, and a fixing element 52 which is fastened to the secondary cable 40, so that the blocking device 50 and the secondary cable 40 are tightly connected.

Figure 3:
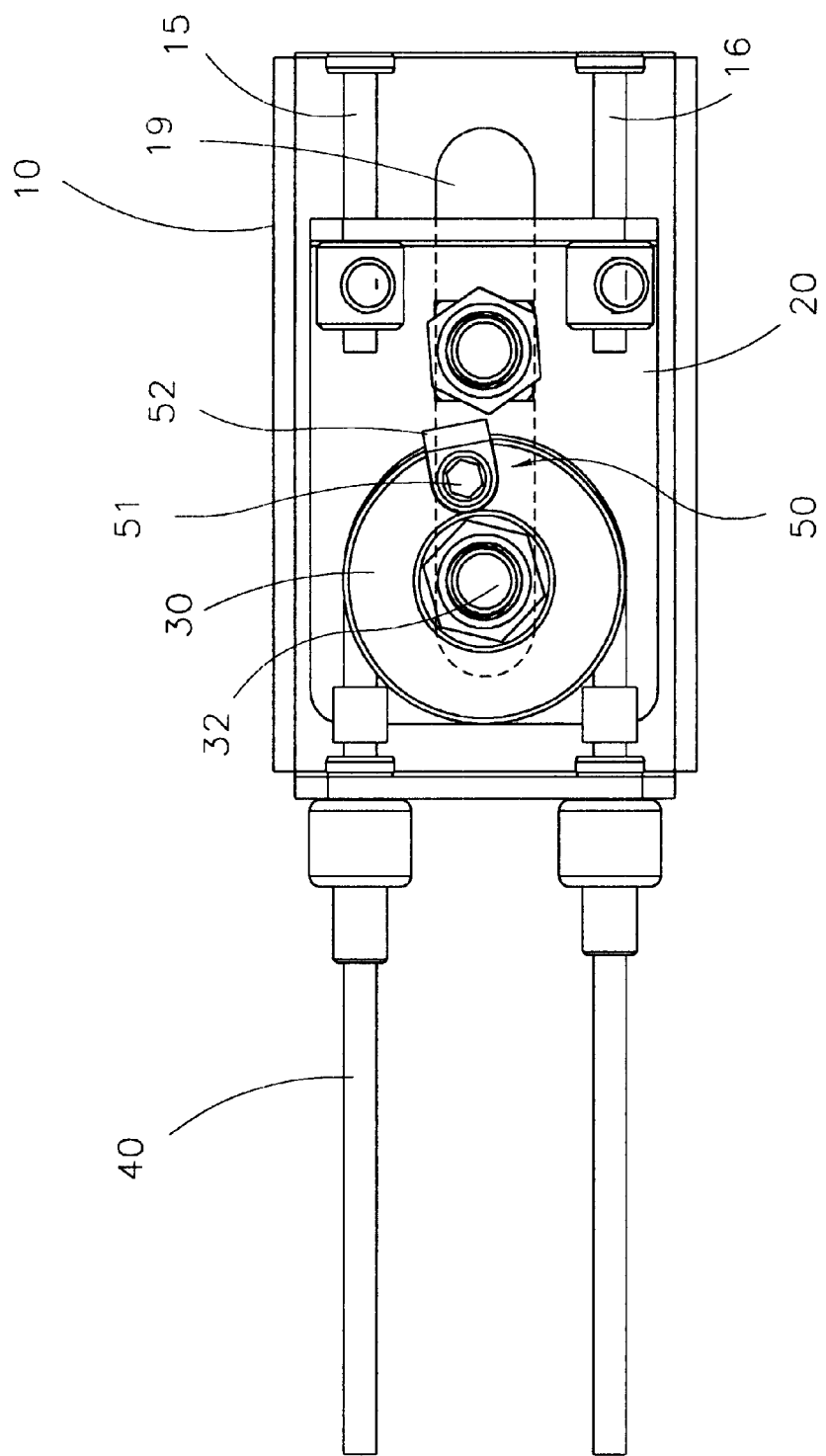
FIG. 3 is a schematic illustration of the movement of the present invention in the first embodiment.

Referring to FIG. 3, when the secondary cable 40 shifts, the driving element 30 performs a turning movement around the axle 32. Since the diameter of the pin 51 is smaller than the width of the linear opening 19, a certain range of the turning movement is allowed, with the pin 19 shifting back and forth between opposite walls of the linear opening 19, but limited by the pin 19 hitting the walls of the linear opening 19.

The secondary cable 40, though gripped by the fixing element 52, is still allowed to perform a longitudinal movement, compensating nonuniform braking forces. When the synchronous braking system of the present invention is installed, the two ends of the secondary cable 40 are adjusted in length for synchronous braking. Therefore, any compensating longitudinal movement of the secondary cable 40 will be small, with the pin 51 moving within the walls of the linear opening 19.

If it happens that one end of the secondary cable 40 breaks, the other end thereof is still connected with the driving element 30, exerting a counterforce on the driving element 30, turning the driving element 30. Due to the pin 51 hitting one of the walls of the linear opening, the turning movement is restricted, and a braking force is still transferred by the secondary cable 40 to one of the brakes. Thus the risk of total failure of both brakes due to breaking of the secondary cable 40 is eliminated.

The present invention not only ensures a synchronous braking effect, but also maintains a braking effect when the secondary cable 40 is broken, so that there is no danger of total failure of braking.

Figure 4:
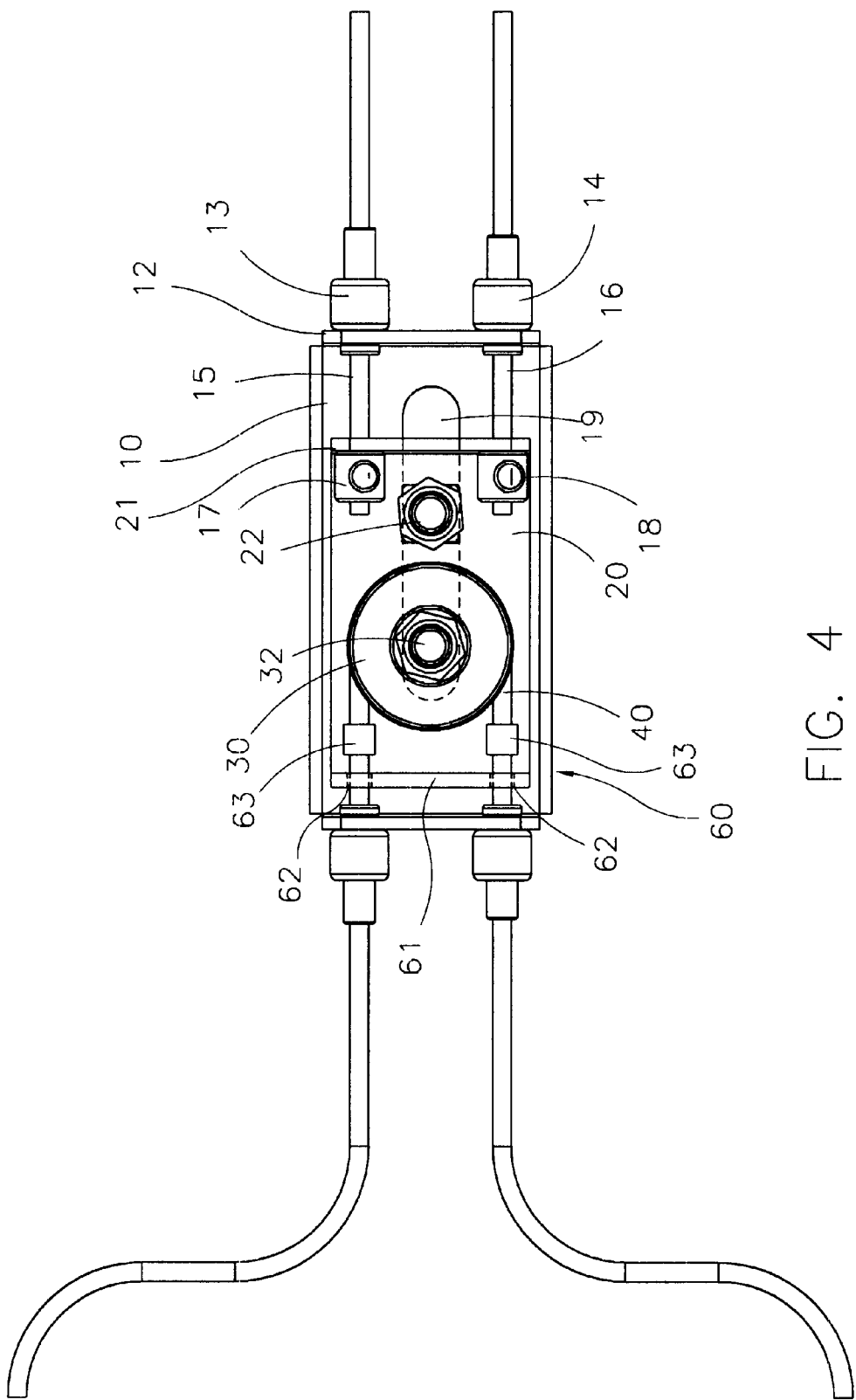
FIG. 4 is a top view of the synchronous braking system of the present invention in the second embodiment.

Referring now to FIG. 4, in a second embodiment of the present invention, a blocking device 60 is employed that is different from the first embodiment. The blocking device 60 comprises: a butt plate 61, set on the gliding unit 20 on an end thereof opposite to the primary cables 15, 16; holes 62 which allow the secondary cable 40 to pass through; and blocking elements 63, fastened to the secondary cable 40 close to the butt plate 61 at preset distances thereto. The blocking elements 63 have outer diameters that are larger than the diameters of the holes 62. Thus, when the secondary cable 40 is shifted beyond the distance between the butt plate 61 and the blocking elements 63, the longitudinal movement thereof is restricted by one of the blocking elements 63 hitting the butt plate 61. Therefore, when one end of the secondary cable 40 breaks, the resulting longitudinal movement thereof is restricted by one of the blocking elements 63 being held back by the butt plate 61, so that a braking force is still transferred by the secondary cable 40 to one of the brakes.

While the invention has been described with reference to preferred embodiments thereof, it is to be understood that modifications or variations may be easily made without departing from the spirit of this invention which is defined by the appended claims.

What is claimed is:

1. A synchronous braking system, comprising:

a seat;

a gliding unit, mounted on said seat and being able to glide thereon in a linear movement;

two primary cables, each having a far end that is connected with said gliding unit, causing, when pulled on, said gliding unit to perform said linear movement;

a secondary cable, having two ends that are connected with two brakes, respectively, causing, when pulled on, said two brakes to perform braking movements;

a driving element, mounted on said gliding unit, having a roll that is able to perform a turning movement, with said secondary cable running over said roll and, when pulled aside by said linear movement, driving said two brakes, while compensating nonuniform braking forces by a longitudinal movement over said roll; and a blocking device, tightly fastened to said secondary cable, having a pin with a diameter which passes through an opening in said seat with a width, said width of said opening being larger than said diameter of said pin, so that said pin is allowed a restricted movement within said opening;

wherein said turning movement of said driving element is restricted to a range, restricting said longitudinal movement of said secondary cable to a maximum displacement, so that, if one of said two ends of said secondary cable breaks, with an unbroken end remaining, said unbroken end will still exert a braking force.

2. A synchronous braking system, comprising:

a seat;

a gliding unit, mounted on said seat and being able to glide thereon in a linear movement;

two primary cables, each having a far end that is connected with said gliding unit, causing, when pulled on, said gliding unit to perform said linear movement;

a secondary cable, having two ends that are connected with two brakes, respectively, causing, when pulled on, said two brakes to perform braking movements;

a driving element, mounted on said gliding unit, having a roll that is able to perform a turning movement, with said secondary cable running over said roll and, when pulled aside by said linear movement of said driving element, driving said two brakes, while compensating nonuniform braking forces by a longitudinal movement over said roll; and a blocking device, further comprising a butt plate, fastened to said gliding unit and having two holes with inner diameters, said two ends of said secondary cable being led through said two holes, and two blocking elements, tightly fastened to said secondary cable at preset distances to said butt plate and having outer diameters that are larger than said inner diameters of said holes, so that each of said two blocking elements is unable to pass through said butt plate;

wherein said longitudinal movement of said secondary cable is restricted to a maximum displacement, so that, if one of said two ends of said secondary cable breaks, with an unbroken end remaining, said unbroken end will still exert a braking force.

* * * * *